Figure 7:
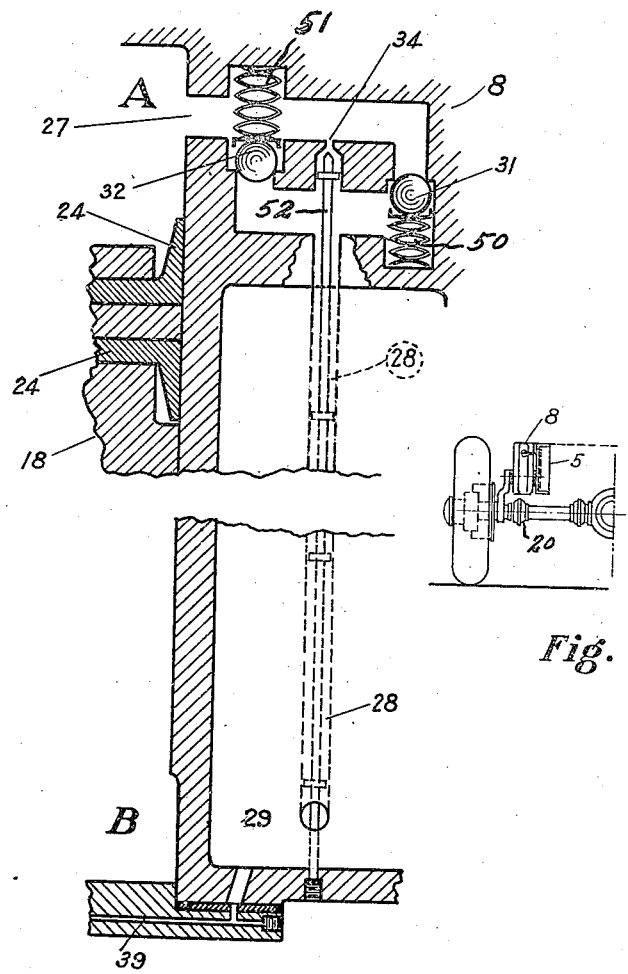

Nov. 14, 1933.　　　　H. L. HIRSCHLER　　　　1,934,764
HYDROPNEUMATIC SUSPENSION SYSTEM
Filed Sept. 2, 1932　　　3 Sheets-Sheet 1
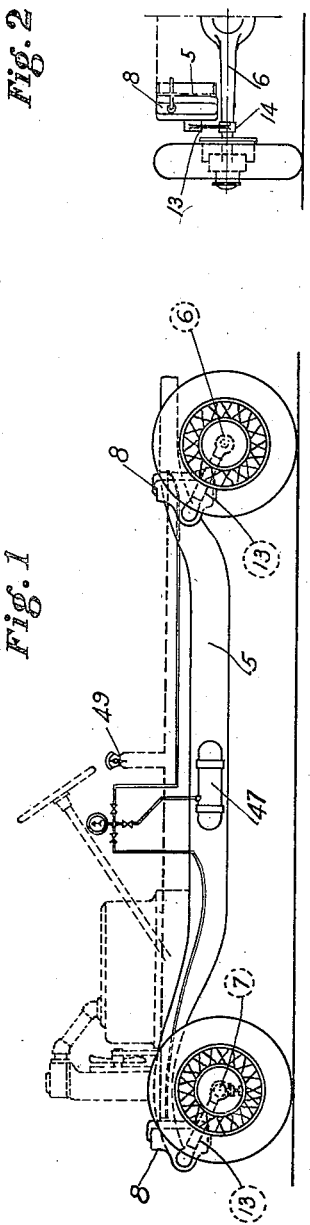
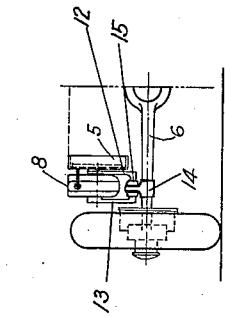
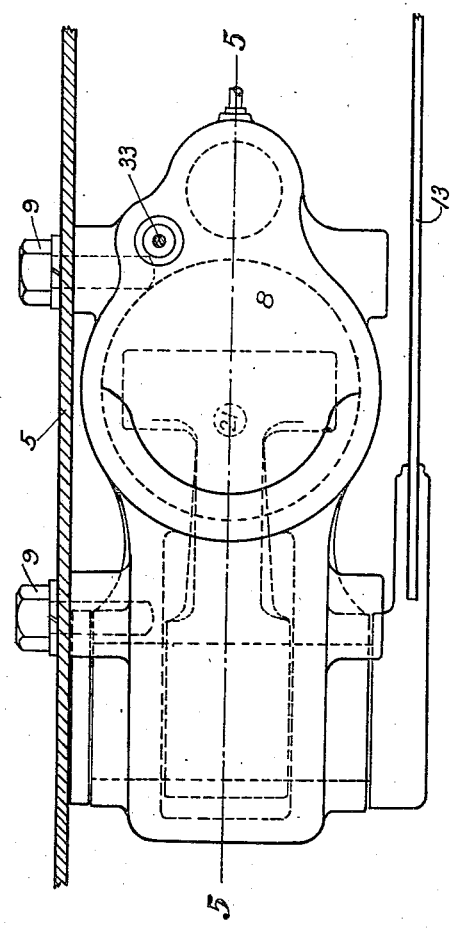
INVENTOR.
Horace L. Hirschler.
BY
ATTORNEY

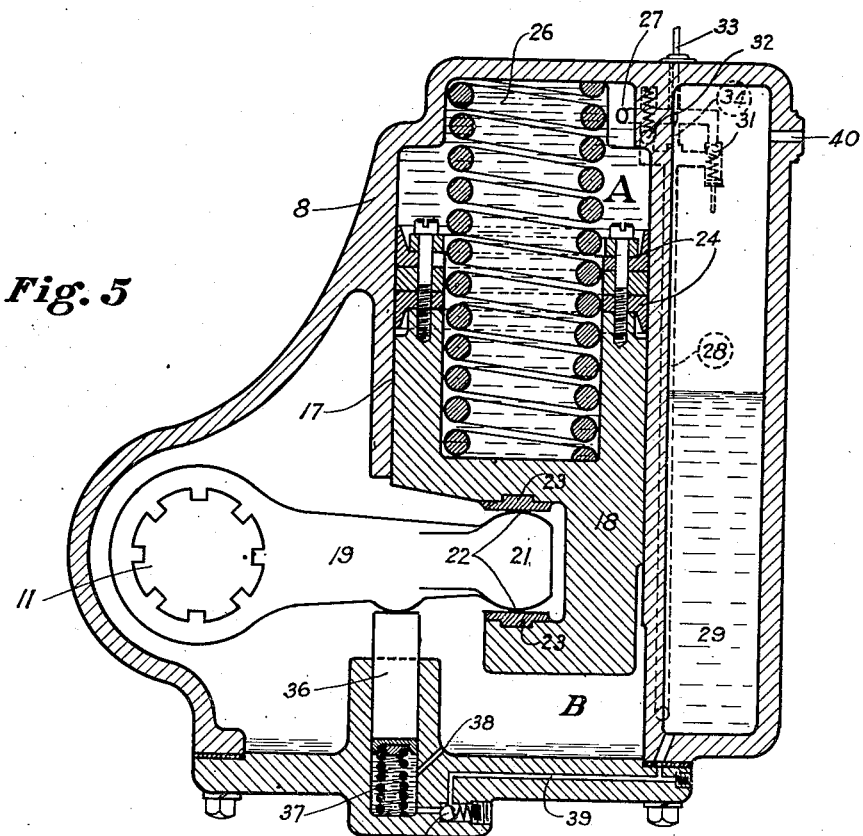
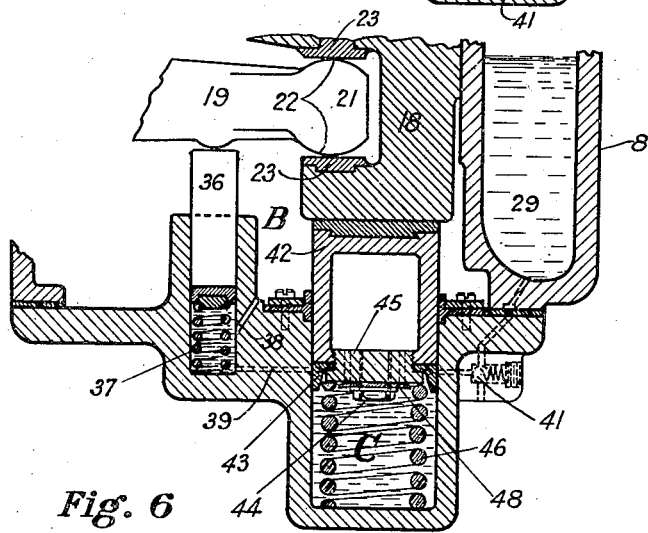

Nov. 14, 1933.          H. L. HIRSCHLER                 1,934,764
                 HYDROPNEUMATIC SUSPENSION SYSTEM
                    Filed Sept. 2, 1932      3 Sheets-Sheet 3

INVENTOR.
Horace L. Hirschler.
BY
ATTORNEY

Patented Nov. 14, 1933

1,934,764

UNITED STATES PATENT OFFICE 1,934,764

HYDROPNEUMATIC SUSPENSION SYSTEM

Horace L. Hirschler, San Francisco, Calif., assignor to Joseph B. Strauss, San Francisco, Calif.

Application September 2, 1932. Serial No. 631,596

7 Claims. (Cl. 267—15)

This invention relates to improvements in suspension systems for motor vehicles.

The principal object of this invention is to produce a device which will translate severe road shocks into long undulating motion.

A further object is to produce a device whereby the relative motions between a vehicle chassis and the axles thereof are effectively dampened.

A further object is to produce a device of this character which may be attached to a vehicle without materially altering its construction.

A further object is to produce a device which is economical to manufacture, compact in design and sturdy in construction.

A still further object is to provide means whereby the amount of resiliency may be controlled from a remote point.

Other objects and advantages will be apparent during the course of the following description.

In the accompanying drawings forming a part of this specification and in which like numerals are employed to designate like parts throughout the same, Fig. 1 is a side elevation of a motor vehicle chassis having my invention applied thereto, Fig. 2 is a fragmentary rear elevation of Fig. 1, Fig. 3 is an enlarged top plan view of my suspension means, Fig. 4 is a view similar to Fig. 2, showing a modified form of connecting arm, Fig. 5 is an enlarged longitudinal cross sectional view taken on the line 5—5 of Fig. 3, Fig. 6 is a fragmentary cross sectional view showing a modified form of my device, Fig. 7 is a fragmentary view showing a thermostatic control system, and Fig. 8 is a view similar to Fig. 2, showing my device applied to independently suspended wheels.

It has been common to employ various forms of springs for the purpose of suspending a vehicle chassis above the axle of the vehicle. These springs have certain inherent disadvantages which are well known, and it is to eliminate these disadvantages that I have devised a suspension employing an air cushion combined with a hydraulic medium which will absorb road shocks, which would otherwise be transmitted to the chassis and consequently to the body of the vehicle.

In the accompanying drawings wherein for the purpose of illustration is shown a preferred embodiment of my invention, the numeral 5 designates a vehicle chassis, but it is of course understood that my system may be applied to any form of vehicle without altering the spirit of the invention. The numerals 6 and 7 refer to the customary rear and front axles respectively, of the vehicle and it is between these axles and the chassis that my invention applies. The numeral 8 refers to a casting which is attached to the chassis 5 by bolts 9. Journalled in the casting 8 is a shaft 11 which has rigidly secured thereto, lever 13. Each of these levers has its free end secured to a bearing 14 which surrounds either the axle 6 or 7 as the case may be. In the form shown in Fig. 4 two levers 12 and 13 are employed and are connected to a ball joint 15 and in Fig. 8 the lever is rigidly connected to the wheel spindle and a universal joint at the point 20 permits the wheel to move without effecting any of the other wheels. The structure just described completes the physical connection between the chassis and the axles. It is understood that there is one of these devices adjacent each of the wheels of the vehicle.

Within the casting 8 is formed a bore 17 within which a piston 18 is adapted to be reciprocated. The reciprocation is effected through the medium of an arm 19 which is splined to the shaft 11 and has a T head 21 provided with arcuate faces 22 which bears upon wearing plates 23 carried in the piston 18. Cup washers are shown at 24 which serve to seal the piston to the bore 17. A spring 26 has one end positioned in a recess formed within the piston 18 and has its opposite end bearing against the casting 8. This spring is merely auxiliary to the operation of the device and serves the purpose of supporting the whole load only in case the pneumatic system should fail and the piston should rise beyond its normal travel. The chamber A formed above the piston 18 communicates with a port 27 which port communicates with a passage 28 which passage in turn communicates with an oil sump 29. Check valves 31 and 32 are interposed between the port 27 and the passage 28. A needle valve 33 adjustable from a remote point controls the flow of liquid through a regulating port 34. A pump 36 is held by a spring 37 against the arm 19. A port 38 extends between the space B and the space beneath the pump 36. A passage 39 extends between the space beneath the pump 36 and the oil sump 29. A ball check 41 is interposed in this passage 39, the operation of which will be later described.

In the modified form shown in Fig. 6 an auxiliary rebound check is shown at 42 and is in the form of a hollow piston which contacts the bottom of the piston 18 and has a cup washer 43 which is held to the piston 42 by a tubular bolt 44. A spring 46 serves to hold this piston 42 against the piston 18. The space C is filled with a fluid, the purpose of which will be later described. An air tank 47 is mounted upon the chassis and communicates through suitable pipes with an air inlet 40, in each device.

Assuming now that one of my devices is attached to a vehicle frame and at a point adjacent each of the wheels and these devices are connected to the air tank 47 and the needle valve 33 is also connected to a ride control lever 49, the operation will be as follows:—Air is admitted from the air tank to each of the devices which air will enter the oil sump through the port 40 and press upon the oil contained therein. This oil will be forced through the passage 28 and through the regulating port 34 out of the port 27 and into the chamber A, thus exerting a downward pressure upon the piston 18, it of course being understood that the chamber has been previously filled with oil so that there is no air therein. This downward movement of the piston 18 will be transmitted to the arm 19, shaft 11 and lever 12, with the result that the chassis will be raised away from the axles an amount depending upon the air pressure admitted. Now assuming that the vehicle is under way, and that a road shock is encountered, the result will be that the shock will be transmitted into a reverse direction from that just described for the downward movement of the piston and consequently the piston 18 will move upwardly forcing the oil in the chamber A through the port 27 through the regulating port 34 through the passage 28 and into the sump 29. The valves 31 and 32 only function when an excessive shock is encountered, the regulating port 34 being sufficient to allow the average flow of the oil. Now by moving the ride control lever 49 the rate of flow of fluid through the regulating port 34 may be controlled from the driver's seat. As soon as the shock has been passed the air within the sump will cause the oil to flow back into the chamber A. Should any oil leak past the piston 18 it will flow through the passage 38 beneath the pump 36 and downward movement of the arm 19 will actuate the pump so as to force this oil past the check valve 41 and through the passage 39 into the oil sump.

In the modified form shown in Fig. 6 rapid rebound will cause the piston 18 to move against the piston 42 thus forcing the oil in the chamber C, upwardly through the tubular bolt 44 thus compressing the air within the piston 42. It will thus be seen that by varying the amount of air admitted to the device the degree of suspension may be varied to accommodate for varying loads, and by the manipulation of the needle valves, the speed of action of the device may be regulated which will effect the rate of oscillation, ironing out the road shocks whether from a comparatively smooth road or a very rough one.

In Fig. 7 I have shown the valves 31 and 32 held in place by bimetal thermostat springs 50, 51, respectively and the needle valve effecting the port 34 operated by a thermostatic rod 52.

It is to be understood that the forms of my invention herewith shown and described, are to be taken as preferred examples of the same and that various changes relative to the material, size, shape and arrangement of parts may be resorted to without departing from the spirit of the invention or the scope of the subjoined claims.

Having thus described my invention, I claim:—

1. In a device of the character described including a chamber having a movable piston therein, of an oil sump, a passage connecting said chamber and said sump, an inlet and outlet valve positioned in said passage, a regulating port by-passing said valves, and means for controlling the action of said valves and said port.

2. In a device of the character described, a load carrying member, a support yieldingly connected thereto, said support comprising a hydropneumatic chamber secured to said load carrying member, a piston movable in said chamber, a lever system connecting said piston and said load carrying member, a fluid holding sump associated with said chamber, a port connecting with the upper portion of said chamber, a passage communicating with said port and sump, an inlet valve and an outlet valve interposed between said port and said passage, whereby the flow of fluid from said chamber to said sump is independently controlled in both directions.

3. In a device of the character described, a load carrying member, a support yieldingly connected thereto, said support comprising a hydropneumatic chamber secured to said load carrying member, a piston movable in said chamber, a lever system connecting said piston and said load carrying member, a fluid holding sump formed adjacent said chamber, a port connecting with the upper portion of said chamber, a passage communicating with said port and the lower part of said sump, an inlet valve and an outlet valve interposed between said port and said passage, whereby the flow of fluid from said chamber to said sump is independently controlled in both directions, and thermal means for regulating the degree of opening of said valves.

4. In a device of the character described, a load carrying member, a support yieldingly connected thereto, said support comprising a hydropneumatic chamber secured to said load carrying member, a piston movable in said chamber, a lever system connecting said piston and said load carrying member, a fluid holding sump formed adjacent said chamber, a port connecting with the upper extremity of said chamber, a passage communicating with said port and said sump, an inlet valve and an outlet valve interposed between said port and said passage, whereby the flow of fluid from said chamber to said sump is independently controlled in both directions, thermal means for regulating the degree of opening of said valves, and a regulating port capable of by-passing fluid past said valves to a predetermined capacity.

5. In a device of the character described, a load carrying member, a support yieldingly connected thereto, said support comprising a hydropneumatic chamber secured to said load carrying part, a piston movable in said chamber, a lever system connecting said piston and said load carrying member, a fluid holding sump associated with said chamber, a port connecting with the upper portion of said chamber, a passage communicating with said port and said sump, an inlet valve and an outlet valve interposed between said port and said passage, whereby the flow of fluid from said chamber to said sump is independently controlled in both directions, thermal means for regulating the degree of opening of said valves, a regulating port capable of by-passing fluid past said valves to a predetermined capacity, and means for thermally controlling the flow of fluid through said regulating port.

6. In a device of the character described, a load carrying member, a support yieldingly connected thereto, said support comprising a hydropneumatic chamber rigidly secured to said load carrying member, a fluid controlled piston movable in said chamber, a lever system connecting said piston and said load carrying member, said piston tending to counteract the load transmitted through said lever system, a sump communicating with said fluid, and means for returning leakage from said piston to said sump.

7. In a device of the character described, a load carrying member, a support yieldingly connected thereto, said support comprising a hydropneumatic chamber rigidly secured to said load carrying member, a fluid controlled piston movable in said chamber, a lever system connecting said piston and said load carrying member, said piston tending to counteract the load transmitted through said lever system, a sump connecting with said fluid, means for returning leakage from said piston to said sump, and a spring in said piston and bearing against the upper portion of said casing, whereby upon release of said fluid pressure said spring and casing cooperate to carry said load.

HORACE L. HIRSCHLER.